Jan. 17, 1967 S. R. BARNETTE 3,298,894
PLASTIC ARTICLE WITH ENVELOPED CORE
Filed Jan. 14, 1963 3 Sheets-Sheet 1

INVENTOR.
BY Stanley Ronald Barnette

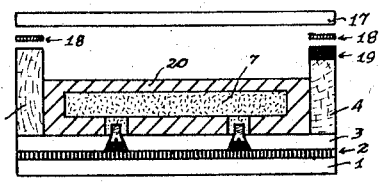
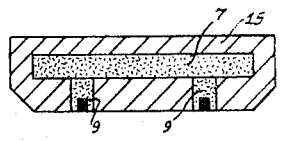
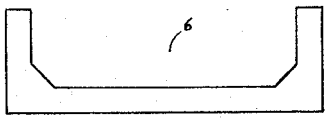
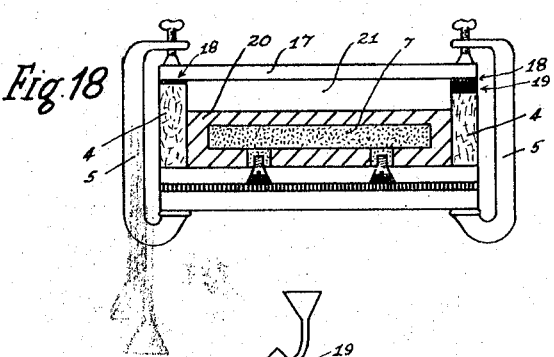
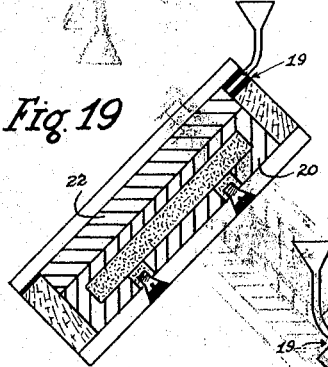
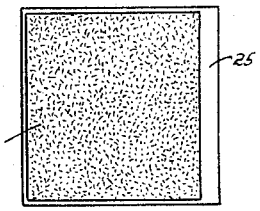
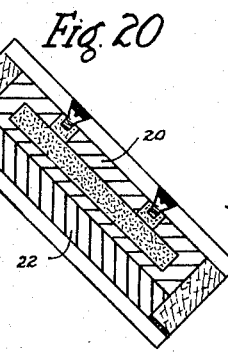
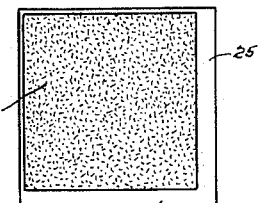
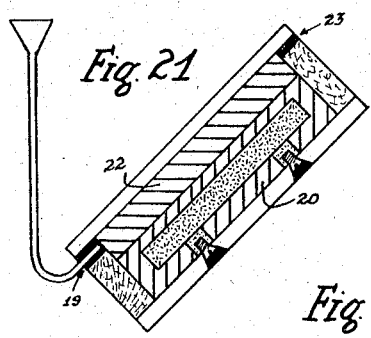
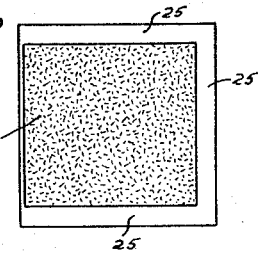
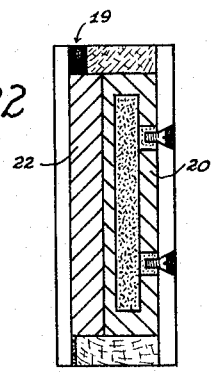
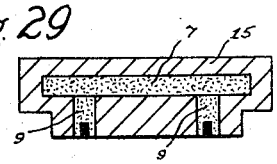
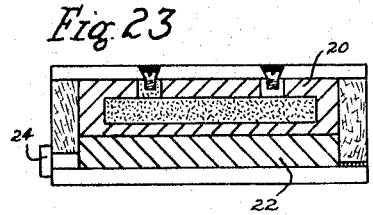

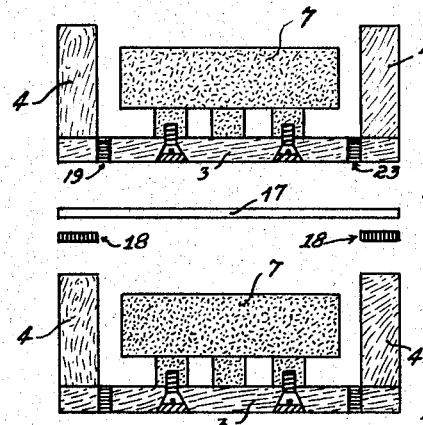
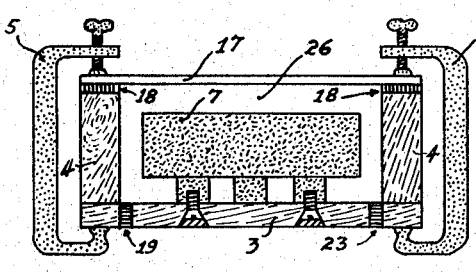
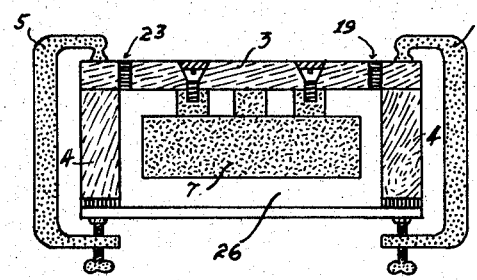
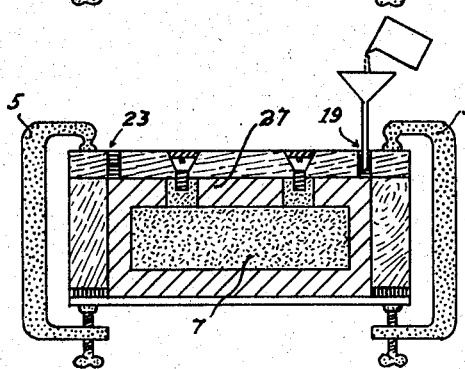
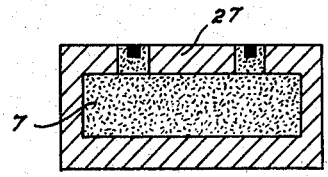
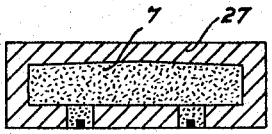
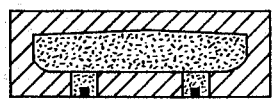
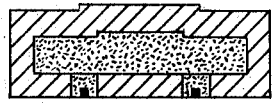
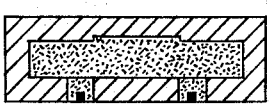
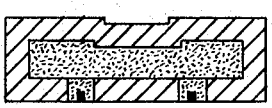
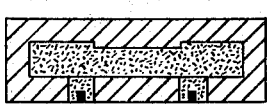
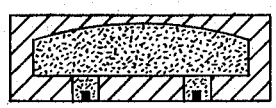
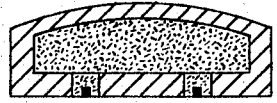
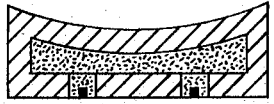

United States Patent Office 3,298,894
Patented Jan. 17, 1967

3,298,894
PLASTIC ARTICLE WITH ENVELOPED CORE
Stanley Ronald Barnette, 90 Cherokee St.,
Miami Springs, Fla. 33166
Filed Jan. 14, 1963, Ser. No. 251,260
6 Claims. (Cl. 161—43)

This application is a continuation-in-part of my copending application Ser. No. 808,599, filed Apr. 24, 1959, now Patent No. 3,072,973.

This invention relates to a process for producing plastic articles, namely, structural panels, table tops, flooring, roofing, furniture, window sills, walls, etc., having a structural core substantially enveloped in said plastic.

It should be understood that following the method and principle of the invention above disclosed that table tops, decorative panels, wall panels, as well as structural surfacing material of various kinds, may be formed. (Please refer to col. 4 lines 19–22 of application 808,-599 now Patent No. 3,072,973 of which this is a continuation in part.)

Another object of this invention is to provide structural core readily shaped and constructed so as to be interlocked into the plastic body of the article that surrounds said core.

The invention relates to a method of forming articles of laminated plastic by a casting process which includes having the articles in any desired shape or form and with plain or decorative surfaces and/or plain or decorative embedments.

The invention contemplates the method of enveloping a core stock whereby to attain a product having bulk without excess weight and with full strength characteristics.

Another object of the invention is to provide a method wherein the cast laminated material is provided with an extremely smooth or embossed effect, relatively hard surface.

Any thermosetting or thermoplastic resinous material or matter which hardens with cure, such as epoxy, polyester, styrene, methyl-methacrylate or any others, can be used in formulating the cast laminated sheeting and enveloping process.

It will be noted from the foregoing description that I have provided as an article of manufacture, a cast plastic sheet suitable for many uses, such as, for example, but not limited to table tops, and that said sheet has considerable bulk or as much bulk as may be desired, without any greater weight than that of the plastic, the bulk being provided to the extent desired by an insert or core which is so embedded and in effect welded to the plastic material which surrounds it as to be integral. The cores can be of a wide variety and as light or as heavy as desired. The method or process of production is such that the sheet produced, whether with or without a core or filler, can be wholly or partially transparent and of any desired variety or mixtures of colors. By suitable embedments either per se or in addition to the core or filler, any number of beautiful designs and decorative motifs can be had.

It is another object of this invention to produce articles having a plastic body self-bonded and interlocked to the core, having a unitary, integral and seamless plastic edge, with any desired exterior surface finish and having a deep three-dimensional decorative effect visible through the plastic, said core providing rigidity, light-weightedness, acoustical properties, shock-proof properties, insulation properties, etc.

Finally this invention relates to articles of manufacture in the form of a slab comprising a plastic body substantially enveloping a core, produced by the methods herein disclosed.

In accordance with these and other objects which will become apparent hereinafter, the instant invention will now be described with reference to the accompanying drawings illustrating a preferred embodiment thereof:

In the drawings:

FIGURES 17 through 23 are cross-sectional views of the steps involved in order to produce an article with one finished surface.

FIGURE 24 is a cross-sectional view of an article having a plastic beveled edge produced in the mold illustrated in cross-sectional view in FIGURE 25.

FIGURES 26, 27 and 28 are top views of different positions of a core in the mold in order to form square articles with one, two, or three integral edges at the corresponding sides.

FIGURE 29 is a cross-sectional view of an article having a special edge contour.

FIGURES 30 through 34 are cross-sectional views of the steps involved in order to produce an article with at least one finished surface.

FIGURE 35 is a cross-sectional view of an article produced by means of the steps depicted in FIGURES 30 through 34 which corresponds to FIGURE 9, but in a reversed position.

FIGURES 36 through 46 are cross-sectional views of some different cores readily enveloped and having different shapes and/or different surface finishes.

With reference to the drawings, the instant invention will now be described with reference to an example.

Figure 1:
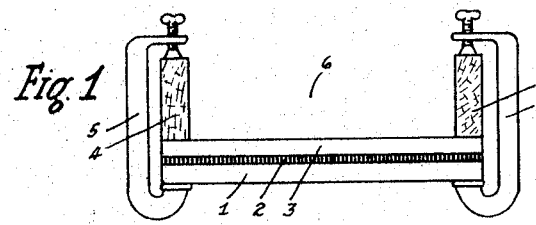
FIGURES 1 and 2 are cross-sectional views of molds that may be employed in the practice of this invention.

FIGURE 1 depicts a mold assembly comprising a leveled platform 1, a metal foil blanket 2, a mold base 3 and mold walls 4. The mold walls and the mold base are tightly secured by means of clamps 5 to form the open mold 6. The open mold 6 in some instances may be replaced by a one section cavity mold illustrated in FIGURE 2, whenever standard sizes are manufactured.

The simple mold forms illustrated at 4 of FIGURE 1 are of the melamine (Formica covered plywood) type as they can be very readily shaped to provide the desired side wall contour of the mold.

The mold base 3 indicated in FIGURE 1, in a glass or melamine type, and a releasing compound for the mold base and mold walls must be used. In the event that a polyester film is used to form the mold base and or the mold walls, no coating is necessary as this material in itself acts as a ready release.

Figure 2:
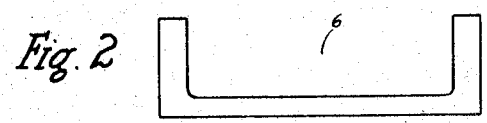

The one section cavity mold illustrated in FIGURE 2 includes rubber, metal, glass or plastic material and in the case of rigid materials, the mold walls will form with the mold base an angle over 90° to permit the removal of the article from the mold.

Figure 3:
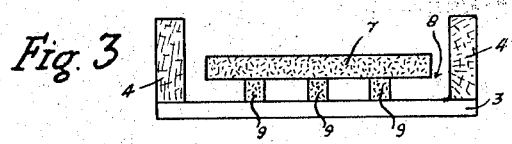
FIGURES 3 through 8 are cross-sectional views of the basic steps to substantially envelope a core.

Referring to FIGURE 3 an example of an article produced by this method will be illustrated step by step through the succeeding illustrations, consisting in a 48" diameter table top.

A ¾" thick structural core 7 as in FIGURE 3 is provided with means to raise said core from the mold base in order to create a predetermined space cavity underneath said core. Said means may consist of elements attached to the core surface that faces the base mold, such as nails, screws, pegs, stoppers, dowels, etc. In order to maintain and secure a leveled core these elements must be of equal length, properly disposed and consist at least of 3. As soon as the core 7 with attached elements 9 is positioned into the open mold with the supporting elements laying on the mold base 3 and centered, means are provided to keep said core in the said position and to maintain the supporting elements 9 in close contact with the mold base. The resultant cavity 8 is limited by the edge and the portion of the core bottom not covered by the attached elements, by the attached elements and by the corresponding sections of the mold.

Figure 4:
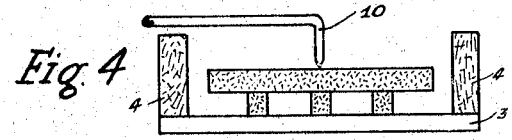
Figure 5:
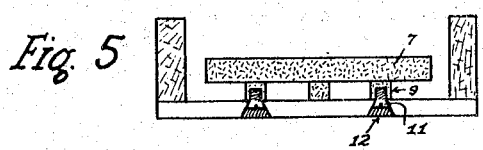

The means to secure the core in position may consist of an upper bar 10 as depicted in FIGURE 4 or screws 11 illustrated in FIGURE 5 secured to the bottom of the supporting elements through machined holes 12 in the mold base 3, the threaded screws 11 engaging the threads provided by the pegs 9, as shown, said means removable at any desired step of the operation and the choice of one system or any other being of no consequence.

In order to substantially envelop the core two different procedures may be followed which are illustrated in FIGURES 6 through 9.

For the example of a 48" diameter table top a mixture is prepared consisting of: 4 quarts of polyester resin, 1/3 quart of styrene, 1 dram of cobalt naphthenate (6% cobalt) and 3 ounces of black polyester paste.

Figure 6:
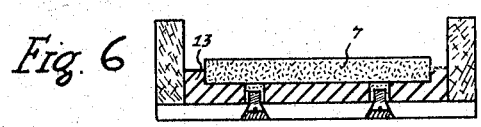

In the first procedure the substantial envelopment is accomplished in two steps:

One half of the mixture is placed in a separate container and mixed with 1% of methyl ethyl ketone peroxide (60%), stirred and poured into the cavity or on top of the core, so that the catalyzed mixture 13 as depicted in FIGURE 6 rises to a partial depth of the mold and permeates a portion of the edges of the core.

Figure 7:
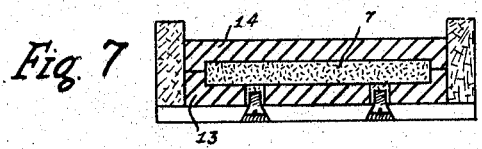

After this first layer hardens to a certain degree the remaining half of the mixture is mixed with 1% of methyl ethyl ketone peroxide (60%), stirred and poured on top of the first layer 13 and leveled to the edges, completely covering the edges and top surface of the core as indicated in 14 FIGURE 7.

As soon as this last mixture is cured the article may be removed from the mold and will have the following characteristics: the plastic surface and edges integral, the self-bonding between both layers is perfect, the plastic is self-bonded to the cure and no seam will be evident at the edges because the proportion of pigment and other materials is the same for both layers. This article is illustrated in cross-sectional view in FIGURE 9.

Figure 8:
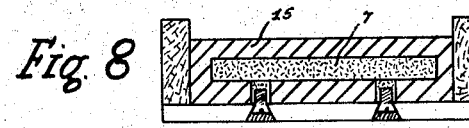

The second procedure to substantially envelop the core is depicted in FIGURE 8. This is accomplished in one step using the total amount of mixture to which 1% of methyl ethyl ketone peroxide (60%) is added, stirred and poured into the cavity or on top of the core and leveled to the edges, completely covering the top of the core and filling the cavity as indicated in 15.

Figure 9:
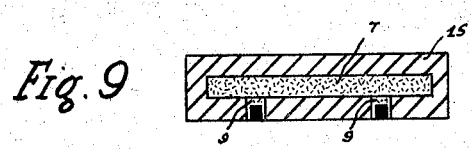
FIGURE 9 is a cross-sectional view of an article produced according to this invention.

After being cured and removed from the mold the article will appear to be the same shown in FIGURE 9 in a cross-sectional view.

It should be noted that in order to avoid any bubble or entrapped air underneath the core or edge contour, the pouring must be made from one side right over the cavity formed between the edge of the core and the mold walls so that the resin is permitted to flow freely into, through and around the cavity following two different paths and displacing the air until said resin completely covers the cavity to the desired level.

The article produced by the described methods will have one even plastic surface with one color, black in the example.

If a decorative effect is desired to be visible through the plastic surface, this may be accomplished by means of the following variations:

(a) Decorative effect formed in the liquid resin mixture that substantially envelops the core.

(b) Decorative effect formed in at least one additional layer of liquid resin mixture formed on top of the plastic that substantially envelops the core.

Figure 10:
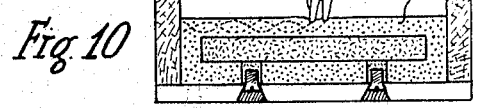
FIGURES 10 through 16 are cross-sectional views illustrating the steps of decorating the liquid resin and enveloping the core to produce an article with one even surface.

The decorative effect can be formed in the liquid resin that substantially envelops the core by means of any of the following examples:

The first example illustrated in FIGURE 10 consists in adding to a predetermined amount of liquid catalyzed resin one amount of pearlessence pigment, stirring, and pouring into the mold as described in FIGURE 8. As soon as the resin mixture covers the top surface of the core by hand means the liquid mixture is agitated in a combing motion to disperse and orient the pearlessence pigment forming a pattern of choice, suspending this combing operation as soon as the increase in the resin viscosity indicates gel stage is reached permitting the pattern to remain fixed into the resin.

Figure 11:
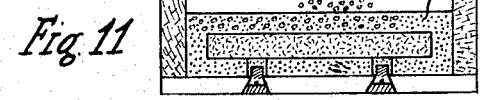

The second example illustrated in FIGURE 11 consists in pouring liquid catalyzed modified resin as indicated in FIGURE 8 and as soon as the top surface of the core is covered with resin by hand means introducing mother of pearl flakes into said liquid resin forming a desired pattern of choice before the increase in the resin viscosity indicates that the gel stage is reached and which proper timing can be controlled by means of accelerator-and-catalyst-to-resin-ratios and operating temperature.

Figure 12:
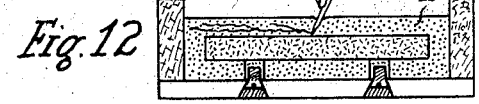

The third example is illustrated in FIGURE 12 wherein by means of a fine pointed instrument that has previously been slightly impregnated or tipped with black polyester paste, black veins are formed in the liquid catalyzed resin mixed with a pearlessence pigment to simulate a marble surface.

Whenever a deeper three-dimensional decorative effect is desired variations may be used by means of additional layers formed on the plastic that substantially envelopes the core.

Figure 13:
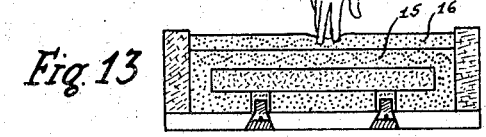
Figure 14:
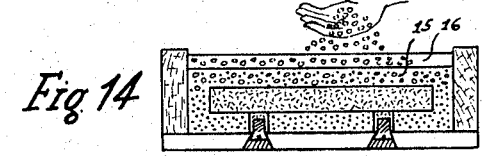

One of these variations consists in forming the first decorative layer in the liquid mixture that covers the top surface of the core as explained before and in permitting this layer to cure, adding additional amounts of liquid resin and forming on each of these layers the desired effect or pattern, following the techniques of adding to the mixture or introducing into the mixture the decorative media as specified in the descriptions of FIGURES 10 through 12. The only precaution is to permit each layer to harden to a certain degree before adding an additional layer of liquid resin. This is depicted in FIGURES 13 and 14, wherein the first decorative effect is formed in the mixture 15 that covers the top of the core and the secondary decorative effect is formed in the additional liquid layer 16.

Figure 15:
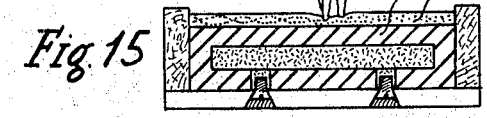
Figure 16:
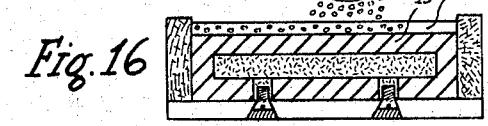

Another variation consists in covering the top surface of the core with opaque pigmented liquid resin to provide the background for the decorative effect and the masking medium for the core, forming the deep three-dimensional decorative effect in additional amounts of liquid resin poured in successive order on top of the opaque layer that covers the top surface of the core. This variation is illustrated in FIGURES 15 and 16, depicting one decorative layer 16 formed by means of dispersing the pearlessence pigment mixed in the resin or by means of introducing the mother of pearl flakes into the resin respectively. As stated before, the only necessary precaution is to permit each layer to harden to a certain degree before adding an additional layer of liquid resin.

Following the described procedures the finished article when removed from the mold will have one even and flat surface, its flatness depending on the viscosity of the resin or the amount of monomer or thinner used.

Sometimes in order to obtain a smoother surface this may be achieved simply by adding a small amount of melted paraffin in styrene. This surface may also be sanded, polished or buffed.

In order to produce any desired and perfect finished surface of the article, the additional steps to be followed are illustrated in FIGURES 17 through 23.

This is accomplished by means of fitting on top of the existing mold assembly, after the clamps are removed, a top cover plate the underside of which conforms to the desired exterior surface finish of the article and a gasket to form a closed mold. This is depicted in FIGURE 17 wherein the top cover plate 17 and the gaskets 18 are in position to be fitted on top of the existing mold assembly described in FIGURE 1. In FIGURE 18 the closed mold is already formed with the clamps 5 tightly securing the top cover plate 17 and the gaskets 18 against the mold walls 4, forming a cavity 21 limited by the top surface of the last cured plastic 20, the mold walls of the existing mold 4, the gaskets 18 and the underside of the top cover plate 17. The slot 19 has previously been machined in the mold walls 4 to provide means to introduce the liquid resin into said cavity and to permit the air to escape through said opening.

Then the entire mold assembly is tilted to an appropriate position so as to permit the introduction of the liquid catalyzed resin 22 into the cavity 21 either from the top or from the bottom, the liquid is introduced as illustrated in FIGURES 19 through 22. In order to facilitate the escape of entrapped air from the cavity, the slot 20 must be properly shaped and located and also the mold assembly can be rotated.

After the cavity is filled and no air bubbles are present the mold may be stored for cure in any desired position, one example illustrated in FIGURE 22, but preferably in a horizontal position depicted in FIGURE 23 so as to guarantee that the liquid resin remains on the face of the top cover plate, plugging the slot by means of plug 24. This position permits better results, because this last plastic layer formed in opposite direction to the preceding layers when cured will provide isotropic properties, equal opposite stresses and extremely hard plastic surfaces, a full description of isotropic properties relating to cast plastic articles is found in applicant's co-pending application, of even date, Ser. No. 254,848, allowed Oct. 23, 1965 for issue.

In another variation explained in column 3, lines 56–58, but in order to produce at least one desired surface of the article, using the total amount of mixture of catalyzed polyester resin in one step, the necessary procedure is illustrated in FIGURES 30 through 34. This is accomplished by means of positioning a structure core 7 on the mold base 3 with means provided to secure said core to the mold base 3, as illustrated in FIGURE 30. After the core is in position, a top cover plate 17, the under side of which conforms to the desired exterior surface finish of article, and the gaskets 18, are fitted on top of the existing mold asembly to form a closed mold as indicated in FIGURE 31. FIGURE 32 depicts the closed mold already formed with clamps 5 tightly securing the top cover plate 17 and gaskets 18 against mold walls 4, forming a cavity 26 limited by the core 7, the mold walls 4 of the existing mold, the gaskets 18 and the under side of the top cover plate 17. The slots 19 and 23 had previously been machined in the mold base 3 to provide means to introduce the liquid resin into said cavity and to permit the air to escape through one or both of said opening.

Then the entire mold assembly is turned as illustrated in FIGURE 33 so as to introduce the liquid catalyzed resin into cavity 26. FIGURE 34 illustrates the liquid resin 27 being introduced into 19. In order to facilitate the entrapped air to escape from the cavity, slot 23 is provided.

When the cavity is filled and air bubbles are released, the mold may be stored to set, and the article when removed from the mold, will have at least one finished surface as indicated in FIGURE 35 wherein the core 7 is substantially enveloped by plastic 27.

The article when removed from the mold will show one perfect finished surface, polished, satin, embossed, raised, sculptured, etched, irregular, etc The decorative effect will be visible through the plastic surface and the deep three-dimensional decorative effect will depend on the amount of layers used to produce said effect.

Also, the pigmented plastic portion that masks or covers the core may be totally or partially visible through the plastic surface or not, but very clearly at the edge and at a portion of the back of the article, the edge being self-formed and self-bonded and integral and unitary with the plastic surface, without seams.

Always the back side of the article will show: the portion of plastic that surrounds the elements attached to the core on that side and which width, thickness and shape depends on the size of the attached elements, the length of said elements, the predetermined contour of the mold base and mold walls, of the back contour of the core; and the portion of the elements which were in contact with the mold base not covered by plastic.

In order to improve the appearance of the back of said article, the attached elements may be removed if same were previously coated with a release, or if desired, used to attach plates or other fastening device. Also, it is possible to apply liquid pigmented catalyzed resin, paint or any other medium to cover said portion of the elements.

FIGURE 24 illustrates an article with a beveled edge produced with a mold base depicted in FIGURE 25.

FIGURES 26, 27 and 28 depict three top views of different variations in positioning the slab core stock whether wood, plywood, particle board, honeycomb, foamed plastic or any other filler, into the mold to have a squared article with one, two or three self-formed edge sides, depending upon their end use which does not require four edges. In such instances the cavity is only formed underneath the core in the selected sides 25.

Finally FIGURE 29 illustrates an article produced in a mold having the mold walls shaped accordingly.

FIGURES 36 through 46 illustrate different examples of substantially enveloped cores using the methods heretofore described.

As examples, articles having a flat surface finish; polished, satin or patterned, are indicated in FIGURES 36, 37, 39, 41, 42 and 44. An article having a raised surface is illustrated in FIGURE 38. An article having an engraved surface is illustrated in FIGURE 40. Articles having a convex and concave surface are illustrated in FIGURES 43 and 45. FIGURE 46 refers to an article having irregular surface and edges as well as a portion of the back side.

In these FIGURES 36 and 46, the cores enveloped show examples of some different shapes or forms of the core as may be used.

What is claimed is:

1. A cast balanced isotropic structural slab decorative surfacing material which comprises one plastic body substantially enveloping a resinous structural slab core stock means, said core stock providing rigidity to said structural slab said plastic body consisting of one decorative cured polymerized resinous liquid layer interlocking and self-bonded to said core, said plastic layer forming the surface, edges and a portion of the back of the article, said core having one flat surface side completely covered by the plastic that corresponds to the surface of the article and an opposite parallel flat surface having at least one attached element extending from said opposite surface and terminating at a level that corresponds to the plastic surface on the back of the article that surrounds said element, thereby providing a predetermined space cavity beneath said core, said core centered and positioned in said plastic body in a plane parallel to the surface of the article, the plastic edges being seamless, unitary and integral with the plastic surface of the article, and having the same thickness measured from the edge of the core to the outer surface of the plastic edge, said article having one even extremely hard plastic surface and a decorative effect visible through the plastic.

2. A cast balanced isotropic structural slab decorative surfacing material which comprises one plastic body substantially enveloping a structural slab core stock means, said core stock providing rigidity to said structural slab said plastic body consisting of a plurality of self-bonded cured polymerized resinous liquid layers interlocking and self-bonded to said core, at least one of said layers containing decorative media within said layer, giving a three-dimensional decorative effect, said plastic body forming the surface, edges and a portion of the back of the article, said core having one flat surface side completely covered by the plastic that corresponds to the surface of the article and an opposite parallel flat surface having at least three attached elements extending from said opposite surface and terminating at a level that corresponds to the plastic surface on the back of the article that surrounds said elements thereby providing a predetermined space cavity beneath said core, said core centered and positioned into said plastic body in a parallel plane to the surface of the article, the plastic edges being seamless, unitary and integral with the plastic body of the article, and having the same thickness measured from the edge of the core to the outer surface of the plastic edge, said article having one even extremely hard plastic surface and a decorative effect visible through the plastic.

3. A cast structural slab decorative surfacing material which comprises two plastic bodies formed in opposite directions substantially enveloping a structural slab core stock means, said core stock providing rigidity to said structural slab the first plastic body consisting of at least one self-bonded cured polymerized resinous liquid layer interlocking and self-bonded to said core, at least one layer containing decorative media within said layer, giving a three-dimensional decorative effect, said plastic layer of said first plastic body formed in an outward direction normal to the surface of the article, the second plastic body consisting of one plastic layer formed in opposite direction to the first plastic body providing isotropic properties, equal stress, a finished surface of the article and self-bonded to the first plastic body, said plastic bodies forming the surface, edges and a portion of the back of the article, said core having one flat surface side completely covered by the plastic that corresponds to the surface of the article and an opposite parallel flat surface having at least three attached elements extending from said opposite surface and terminating at a level that corresponds to the plastic surface on the back of the article that surrounds said elements thereby providing a predetermined space cavity beneath said core, said core centered and positioned into said plastic bodies in a parallel plane to the surface of the article, the plastic edges being seamless, unitary and integral with both plastic bodies of the article and having the same thickness measured from the edge of the core to the outer surface of the plastic edge, said article having two extremely hard molded finished plastic surfaces and a decorative effect visible through the plastic.

4. A decorative table top having the structure of claim 1.

5. The article of claim 4 in which said attached element is removable.

6. The article of claim 1 having a film attached to a surface of said plastic.

References Cited by the Examiner
UNITED STATES PATENTS

| | | | |
|---|---|---|---|
| 2,115,409 | 4/1938 | Casto | 161—6 X |
| 2,277,752 | 3/1942 | Frey | 161—48 X |
| 2,330,497 | 9/1943 | Larmour | 161—6 X |
| 2,482,339 | 9/1949 | Hibbard et al. | 161—6 X |
| 2,494,834 | 1/1950 | Ringheim. | |
| 2,586,978 | 2/1952 | Murray | 161—5 X |
| 2,724,868 | 11/1955 | Kish. | |
| 2,747,230 | 5/1956 | Magnus | 264—275 |
| 2,880,443 | 4/1959 | Febvre | 161—48 X |
| 2,898,258 | 8/1959 | Meier et al. | |
| 2,946,712 | 7/1960 | Greig | 161—43 |
| 2,985,919 | 5/1961 | Borroff et al. | 264—275 |
| 3,020,183 | 2/1962 | Calvaresi | 161—43 |
| 3,090,999 | 5/1963 | Karns | 264—275 |
| 3,150,032 | 9/1964 | Rubenstein. | |

EARL M. BERGERT, *Primary Examiner.*

A. H. BRODMERKEL, *Examiner.*

F. MARLOWE, W. POWELL, *Assistant Examiner.*